United States Patent
Coburn et al.

(10) Patent No.: US 8,301,727 B1
(45) Date of Patent: Oct. 30, 2012

(54) SYSTEM, METHOD, AND COMPUTER PROGRAM PRODUCT FOR RECEIVING SECURITY CONTENT UTILIZING A SERIAL OVER LAN CONNECTION

(75) Inventors: Ward Coburn, Tigard, OR (US); Harvir Singh, Portland, OR (US); Roger Wood, Portland, OR (US)

(73) Assignee: McAfee, Inc., Santa Clara, CA (US)

( * ) Notice: Subject to any disclaimer, the term of this patent is extended or adjusted under 35 U.S.C. 154(b) by 169 days.

(21) Appl. No.: 12/709,397

(22) Filed: Feb. 19, 2010

(51) Int. Cl.
 *G06F 15/16* (2006.01)
(52) U.S. Cl. ............ 709/218; 709/227; 726/22; 717/168
(58) Field of Classification Search .................. None
 See application file for complete search history.

(56) References Cited

U.S. PATENT DOCUMENTS

| | | | |
|---|---|---|---|
| 2006/0130141 A1* | 6/2006 | Kramer et al. | 726/23 |
| 2006/0242396 A1* | 10/2006 | Cartes et al. | 713/1 |
| 2007/0055752 A1* | 3/2007 | Wiegand et al. | 709/220 |
| 2007/0079151 A1* | 4/2007 | Connor et al. | 713/300 |
| 2007/0240222 A1* | 10/2007 | Tuvell et al. | 726/24 |
| 2008/0318658 A1* | 12/2008 | Sylla et al. | 463/20 |
| 2009/0205045 A1* | 8/2009 | Horvath et al. | 726/23 |
| 2011/0145381 A1* | 6/2011 | Saint-Hilaire | 709/223 |
| 2011/0154316 A1* | 6/2011 | Khosravi et al. | 717/173 |

* cited by examiner

*Primary Examiner* — Ario Etienne
*Assistant Examiner* — Clayton R Williams
(74) *Attorney, Agent, or Firm* — Wong, Cabello, Lutsch, Rutherford & Brucculeri LLP

(57) ABSTRACT

A system, method, and computer program product are provided for receiving security content utilizing a serial over LAN connection. In use, an unsuccessful attempt to connect to a network for accessing security content at a remote second device is indicated by a first device, where the unsuccessful attempt results from a malfunction at the first device. Further, the security content is received at the first device utilizing a serial over local area network (LAN) connection established with the remote second device, based on the indication.

18 Claims, 5 Drawing Sheets

US 8,301,727 B1

SYSTEM, METHOD, AND COMPUTER PROGRAM PRODUCT FOR RECEIVING SECURITY CONTENT UTILIZING A SERIAL OVER LAN CONNECTION

FIELD OF THE INVENTION

The present invention relates to receiving security content, and more particularly to receiving security content over a network.

BACKGROUND

Traditionally, security content has been received by devices for in securing such devices. Moreover, such security content has generally been sent to the devices via a network connection established between the devices and remote security content providers. Unfortunately, in some situations the devices may be unable to connect to a network to receive the security content, thus preventing the devices from receiving the security content.

For example, there may be occasions where a device may experience problems accessing the network to periodically download security content updates (e.g. new antivirus definitions). There may be any number of causes due to the many factors and complexities involved around network communications. However, oftentimes the network infrastructure is fully functional, while the device itself (e.g. operating system, network drivers, etc.) has malfunctioned, resulting in the inability of the device to connect to the network. With the inability to connect to the network and receive security content, devices may become vulnerable and may be a risk to the network. Ultimately, when the device is rebooted as a remediation action to correct the network connectivity problem, there may be a higher probability of contracting malware once connected to the network.

There is thus a need for addressing these and/or other issues associated with the prior art.

SUMMARY

A system, method, and computer program product are provided for receiving security content utilizing a serial over LAN connection. In use, an unsuccessful attempt to connect to a network for accessing security content at a remote second device is indicated by a first device, where the unsuccessful attempt results from a malfunction at the first device. Further, the security content is received at the first device utilizing a serial over local area network (LAN) connection established with the remote second device, based on the indication.

DETAILED DESCRIPTION

Figure 1:
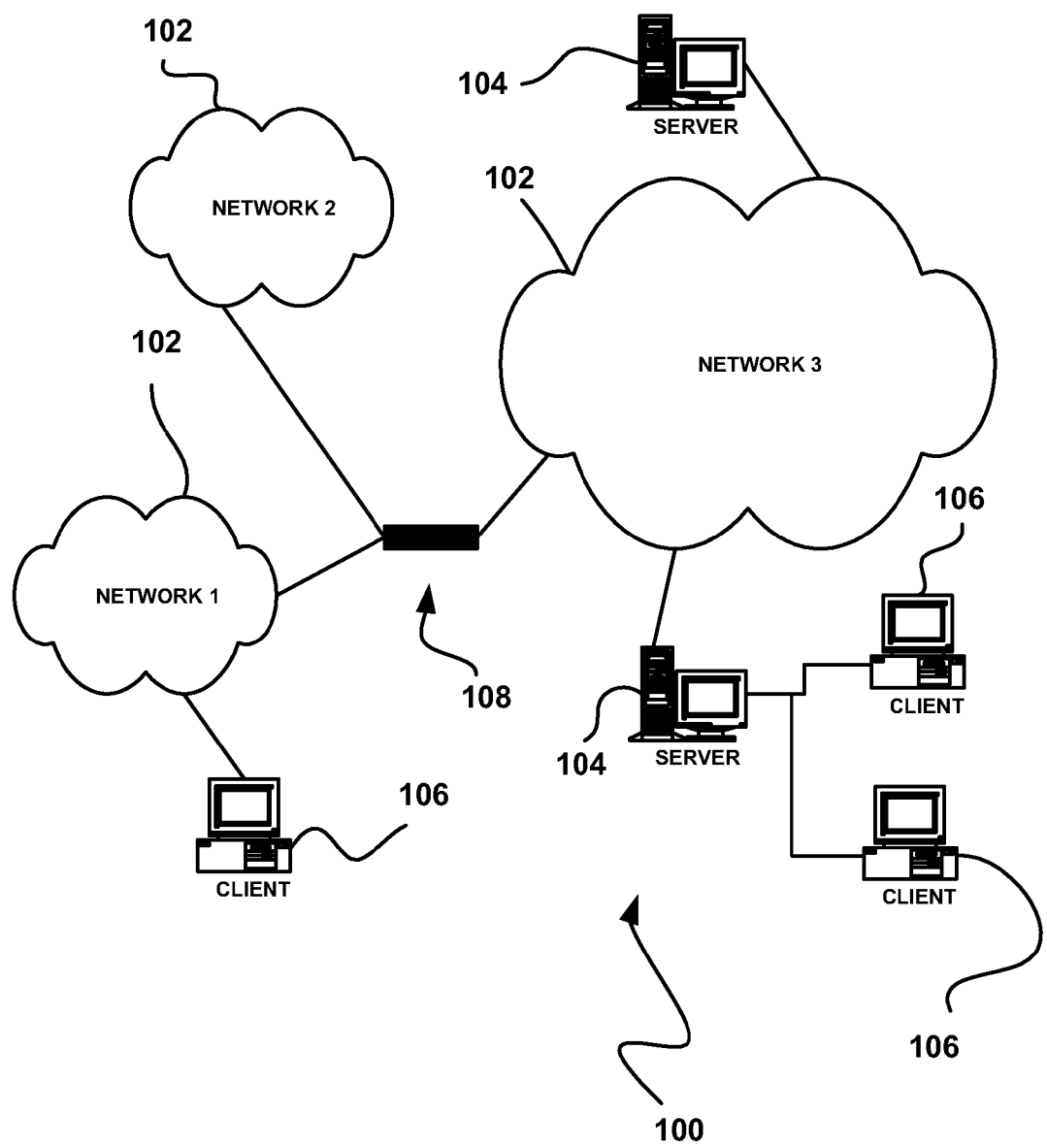
FIG. 1 illustrates a network architecture, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wireless network, a wide area network (WAN) such as the Internet, peer-to-peer network, etc.

Coupled to the networks 102 are servers 104 which are capable of communicating over the networks 102. Also coupled to the networks 102 and the servers 104 is a plurality of clients 106. Such servers 104 and/or clients 106 may each include a desktop computer, lap-top computer, hand-held computer, mobile phone, personal digital assistant (PDA), peripheral (e.g. printer, etc.), any component of a computer, and/or any other type of logic. In order to facilitate communication among the networks 102, at least one gateway 108 is optionally coupled therebetween.

Figure 2:
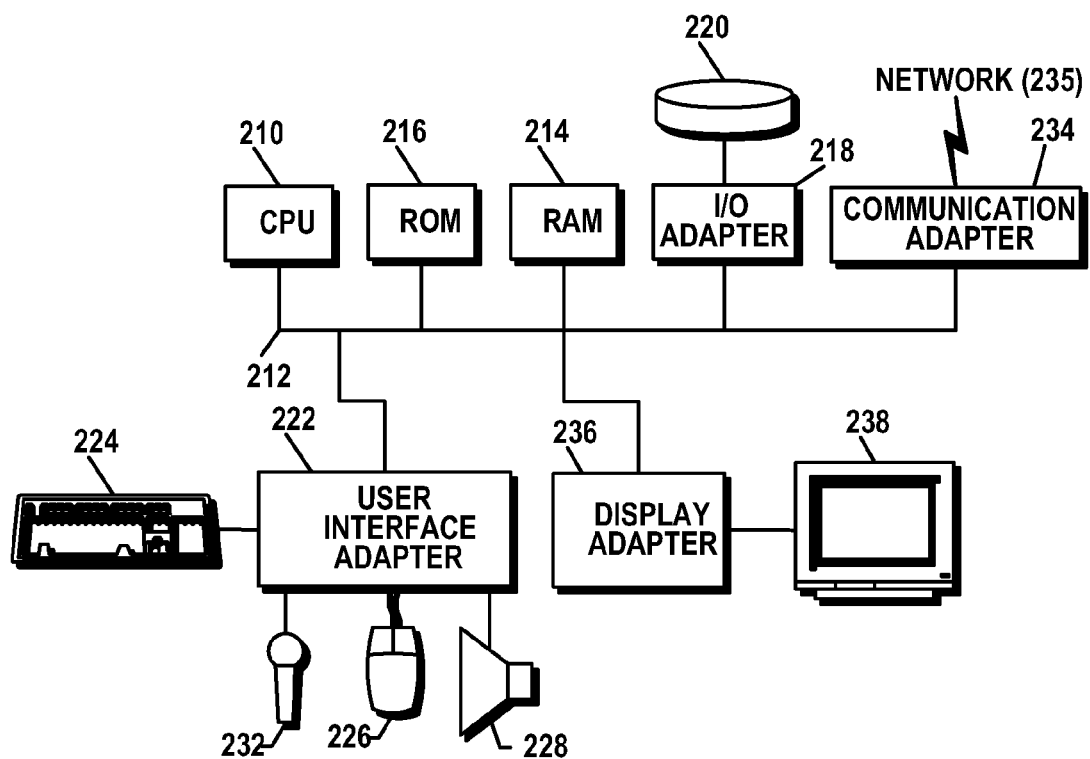
FIG. 2 shows a representative hardware environment that may be associated with the servers and/or clients of FIG. 1, in accordance with one embodiment.

FIG. 2 shows a representative hardware environment that may be associated with the servers 104 and/or clients 106 of FIG. 1, in accordance with one embodiment. Such figure illustrates a typical hardware configuration of a workstation in accordance with one embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon any desired operating system. It will be appreciated that an embodiment may also be implemented on platforms and operating systems other than those mentioned. One embodiment may be written using JAVA, C, and/or C++ language, or other programming languages, along with an object oriented programming methodology. Object oriented programming (OOP) has become increasingly used to develop complex applications.

Of course, the various embodiments set forth herein may be implemented utilizing hardware, software, or any desired combination thereof. For that matter, any type of logic may be utilized which is capable of implementing the various functionality set forth herein.

Figure 3:
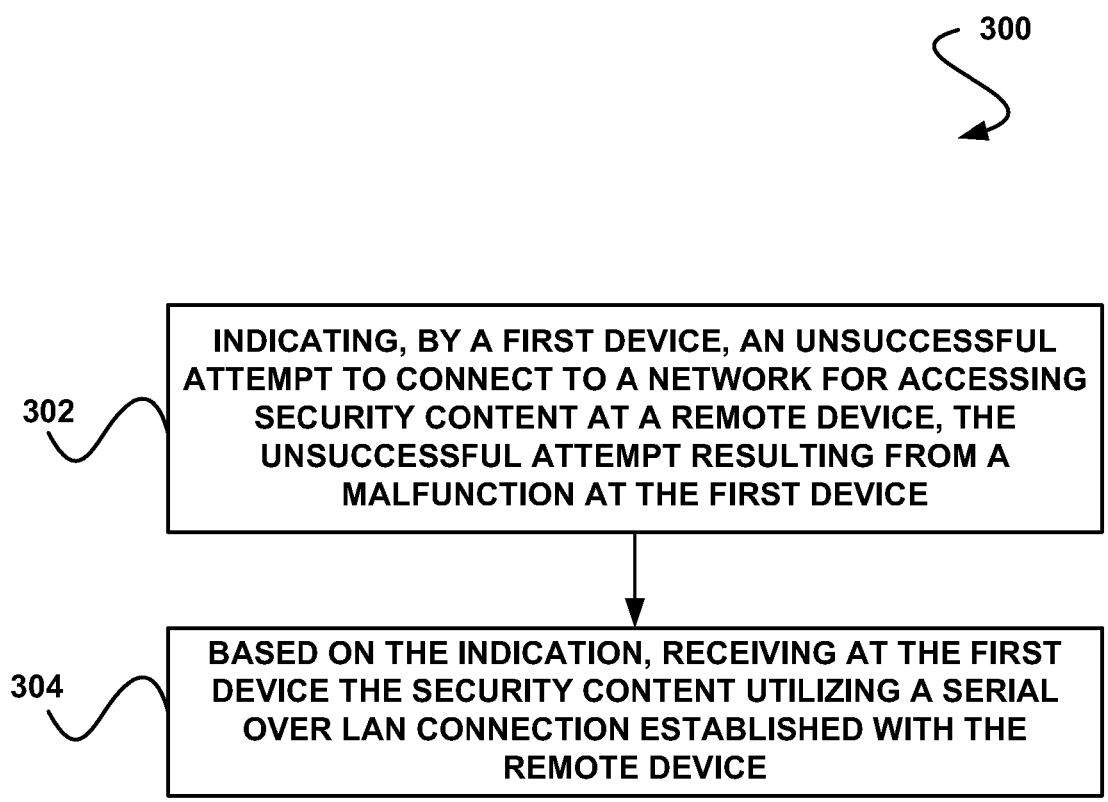
FIG. 3 shows a method for receiving security content utilizing a serial over local area network (LAN) connection, in accordance with another embodiment.

FIG. 3 shows a method 300 for receiving security content utilizing a serial over local area network (LAN) connection, in accordance with another embodiment. As an option, the method 300 may be carried out in the context of the architecture and environment of FIG. 1 and/or 2. Of course, however, the method 300 may be carried out in any desired environment.

As shown in operation 302, an unsuccessful attempt to connect to a network for accessing security content at a remote second device is indicated by a first device, where the unsuccessful attempt results from a malfunction at the first device. With respect to the present description, the first device may include any electronic device capable of receiving security content via a serial over LAN connection. For example, the first device may include the servers 104 and/or clients 106 described above with respect to FIG. 1 and/or 2.

Similarly, the remote second device may include any electronic device capable of providing security content via a serial over LAN connection. Optionally, the remote second device may include a central manager providing security content to a plurality of other devices including the first device. Again, the remote second device may include the servers 104 and/or clients 106 described above with respect to FIG. 1 and/or 2.

To this end, the first device may attempt to connect to a network for accessing (e.g. downloading, etc.) security content at the remote second device. The network may include the Internet or any other network over which security content is capable of being transmitted. It should be noted that the security content may include signatures for use in detecting malware, an application for detecting malware, and/or any other content that is associated with providing security for the first device.

As noted above, however, such attempt to connect to the network is unsuccessful as a result from a malfunction at the first device. In one embodiment, the malfunction at the first device may include a failure associated with software of the first device. For example, the software may necessarily contribute to establishing the connection to the network. Optionally, the software may include a network driver of the first device, an operating system of the first device, etc. Of course, however, the malfunction at the first device may include any fault of the first device which prevents the first device from connecting to the network.

Additionally, the malfunction at the first device may result from any wanted or unwanted condition. Optionally, the malfunction at the first device may result from an unwanted corruption of the aforementioned software of the first device. For example, the corruption may be caused by malware. As another option, the malfunction at the first device may result from a wanted quarantining of the first device from the network due to a non-compliance of the first device. Just by way of example, the malfunction at the first device may result from the first device being non-compliant with a security policy requiring compliance to connect to the network.

In one embodiment, the unsuccessful attempt by the first device to connect to the network may be indicated utilizing a flag. For example, the unsuccessful attempt may be indicated by setting the flag in response to the unsuccessful attempt to connect to the network. Such flag may optionally be set in a storage area of active management technology (AMT) provided by a processor of the first device [e.g. the Intel® AMT provided as a feature of Intel® Core™ vPro™ processors].

In another embodiment, the unsuccessful attempt by the first device to connect to the network may be indicated by sending an error status event to a remote third device in response to the unsuccessful attempt to connect to the network. The error status event may include data indicating the unsuccessful attempt to connect to the network to access the security content at the remote second device. For example, the first device may be incapable of establishing a connection to the network for accessing the security content at the remote second device, but may be capable of establishing a connection to another network for sending the error status event to the remote third device.

To this end, the first device indicates the unsuccessful attempt to connect to the network. In one embodiment, the unsuccessful attempt may be indicated for detection by the remote second device (or the remote third device, as described above). The reasons for such detection by the remote second device/remote third will be described in more detail below with respect to operation 304.

As shown in operation 304, the security content is received at the first device utilizing a serial over local area network (LAN) connection established with the remote second device, based on the indication. Thus, the remote second device or remote third device may detect the unsuccessful attempt by the first device to connect to the network, using the above described indication given by the first device. Just way of example, in the embodiment where the indication is a flag stored in the AMT storage area of the first device, such storage area may be readable by the remote second device for allowing the remote second device to detect the flag. As another example, where the indication is an error status event communicated to the remote third device, the remote third device may detect the unsuccessful attempt by the first device to connect to the network.

As a result of detecting the unsuccessful attempt (utilizing the indication), a serial over LAN connection is established between the first device and the remote second device, for allowing the first device to receive the security content over such serial over LAN connection. In one embodiment, the serial over LAN connection may be established by the remote second device. For example, the serial over LAN connection may be established with the first device by the remote second device in response to the detection of the flag in the AMT storage area of the first device. As another example, the remote second device may be instructed by the remote third device to establish the serial over LAN connection with the first device, in response to the receipt of the error status event by the remote third device.

It should be noted that the serial over LAN connection may include a connection between the first device and the remote second device in which the remote second device connects to a virtual serial port of the first device via an Ethernet port. For example, the operating system of the first device may view the virtual serial port as a physical serial port of the first device, while the remote second device may establish the connection with the virtual serial port via an Ethernet port of the device. As another example, the serial over LAN connection may include a connection by the remote second device to an active management technology BIOS of the first device. To this end, the serial over LAN connection may be established utilizing a layer of the first device existing under the operating system (e.g. operating system network drivers), and may interface directly with hardware of the first device, such as the network interface card of the first device.

Optionally, upon receipt of the security content by the first device, the security content may be installed on the first device for use in securing the first device. As another option, the aforementioned flag may be removed upon receipt of the security content. Of course, the flag may also be removed upon a determination by the first device that a connection to the network has been successfully established.

By using the serial over LAN connection an operating system network communication protocol of the first device may be bypassed when receiving the security content. Thus, a malfunction of the first device (e.g. which disables the functionality of the operating system network communication protocol) may not necessarily prevent the first device from receiving the security content. In this way, it may be ensured that the first device receives any available security content (e.g. updates, etc.) for maintaining security of the first device.

More illustrative information will now be set forth regarding various optional architectures and features with which the foregoing technique may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
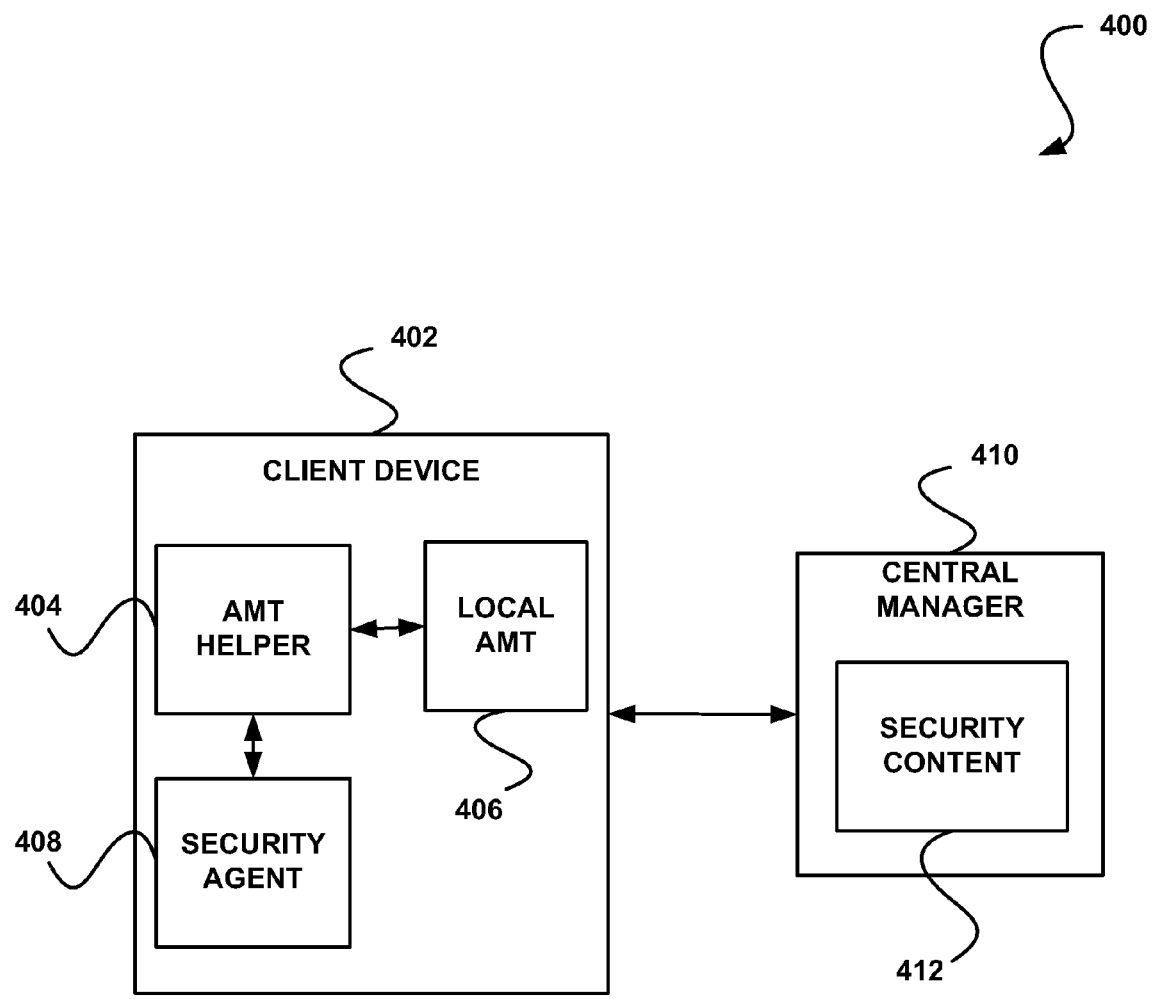
FIG. 4 shows a system for receiving security content utilizing a serial over LAN connection, in accordance with yet another embodiment.

FIG. 4 shows a system 400 for receiving security content utilizing a serial over LAN connection, in accordance with yet another embodiment. As an option, the method 400 may be implemented in the context of the architecture and environment of FIGS. 1-3. Of course, however, the method 400 may be implemented in any desired environment. It should also be noted that the aforementioned definitions may apply during the present description.

As shown, a client device 402 is in communication with a central manager 410. Such communication may be provided over a network, such as the Internet or any other network described above with respect to FIG. 1. It should be noted that the client device 402 may include the first device described above with respect to FIG. 3. Further with respect to the present embodiment, the client device 402 includes Intel's® AMT technology. Additionally, the central manager 410 may include any server, intermediate console, etc. centrally managing a plurality of client devices (e.g. utilizing the network) by at least providing security content to the same. Thus, the central manger 410 may optionally be provided by a security system provider.

The client device 402 includes an AMT helper 404, which may include any tool, service, module, application, etc. providing AMT services to the client device 402. For example, the AMT helper 404 may be created utilizing the AMT software development kit (e.g. version 5.1 or later) provided by Intel®. In one embodiment, the AMT helper 404 may be deployed to the client device 402 by the central manager 410 as a package, and may install itself as an operating service that is initiated upon execution of the operating system.

In use, a security agent 408 of the client device 402 may execute task to receive security content 412 from the central manager 410. For example, the task may include an update task for updating security content of the client device 402 using security content 412 from the central manager 410. The task may include connecting to a network providing communications between the client device 402 and the central manager 410. It should be noted that with respect to the present embodiment, the security agent 408 may include any program, module, etc. provided by the central manager 410 for enabling the central manager 410 to manage the client device 402.

In response to an unsuccessful attempt to connect to the network by the client device 402 resulting from a malfunction of the client device 402, an error condition may be communicated to the AMT helper 404 of the client device 402. The error condition may indicate the unsuccessful attempt to connect to the network. The AMT helper 404 may receive such error condition and provide an indication of the unsuccessful attempt for detection by the central manager 410.

In one embodiment, the AMT helper 404 may provide the indication of the unsuccessful attempt utilizing a flag. For example, the unsuccessful attempt may be indicated by setting the flag in response to the unsuccessful attempt to connect to the network. Such flag may optionally be set in a local storage area 406 of active management technology (AMT) of the client device 402.

With respect to the present embodiment, the local storage area 406 of active management technology (AMT) of the client device 402 may be viewable/retrievable remotely by the central manger 410 for detecting the flag. For example, the central manger 410 may periodically execute a task that scans the local storage area 406 of active management technology (AMT) of the client device 402. Such scan may be utilized for detecting whether a flag is set within the aforementioned local storage area 406.

In another embodiment, the AMT helper 404 may provide the indication of the unsuccessful attempt by sending an error status event to the central manager 410 in response to the unsuccessful attempt to connect to the network. The error status event may include data indicating the unsuccessful attempt to connect to the network. Of course, it should be noted that the error status event may optionally only be sent to the central manager 410 as a result of the client device 402 attempting to connect to the network to access security content at a device separate from the central manager 410. For example, the client device 402 may be incapable of connecting to the network on which the device separate from the central manager 410 is located for accessing the security content, but may be capable of connecting a network on which the central manager 410 is located for sending the error status event.

Upon detection by the central manager 410 of the unsuccessful attempt by the client device 402 to connect to the network, the central manger 410 may establish a serial over LAN connection with the client device 402. As another option, the central manger 410 may instruct the aforementioned separate device to establish a serial over LAN connection with the client device 402. The serial over LAN connection may be established utilizing a layer of the client device 402 existing under the operating system (e.g. operating system network drivers), and may interface directly with hardware of the client device 402, such as the network interface card of the client device 402.

Such serial over LAN connection may then be used to send the security content 412 to the client device 402. In this way, the security content provided to the client device 402 may be stored by the central manager 410, in one embodiment, but in another embodiment may be stored on a remotely located device or distributed across a plurality of remotely located devices capable of establishing a serial over LAN connection to the client device 402.

In one embodiment, the security content 412 may be sent to the AMT helper 404 of the client device 402. The AMT helper 404 may subsequently write the received security content to one or more disk files. Further, after the security content is received by the AMT helper 404, the AMT helper 404 may notify the security agent 408 of the presence of the security content needing to be installed, such that in response security agent 408 may install such security content on the client device 402.

With respect to the embodiment where the AMT helper 404 provides the indication of the unsuccessful attempt utilizing the flag, the AMT helper 404 may remove the flag in response to receipt of the security content. Of course, as another option, the AMT helper 404 may remove the flag in response to a determination by the client device 402 that a connection to the network has been successfully established.

Figure 5:
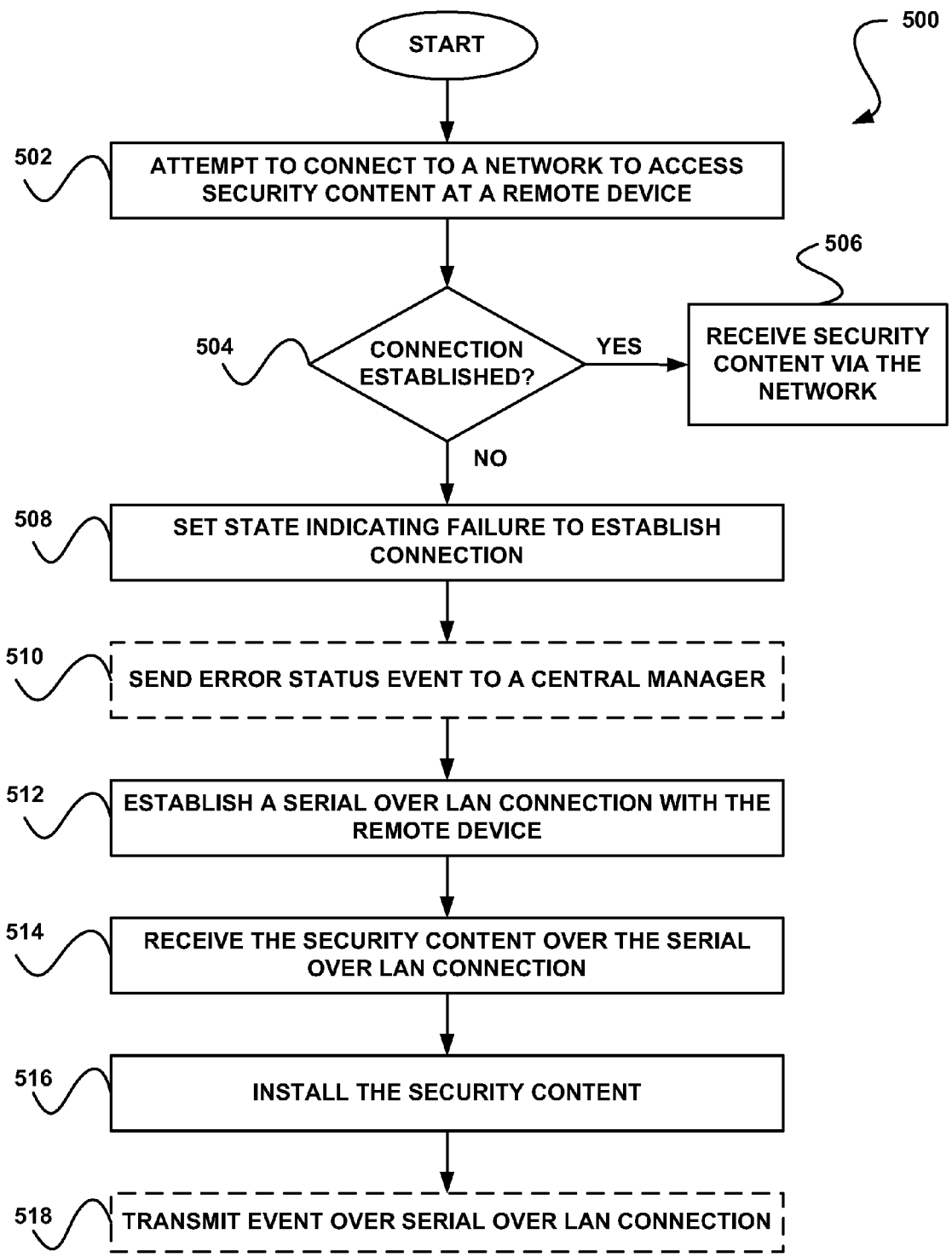
FIG. 5 shows a method for receiving security content utilizing a serial over LAN connection when an attempt to establish a network connection for receiving the security content fails, in accordance with still yet another embodiment.

FIG. 5 shows a method 500 for receiving security content utilizing a serial over LAN connection when an attempt to establish a network connection for receiving the security content fails, in accordance with still yet another embodiment. As an option, the method 500 may be carried out in the context of the architecture and environment of FIGS. 1-4. For example, the method 500 may be carried out by the client device 402 of FIG. 4. Of course, however, the method 500 may be carried out in any desired environment.

As shown in operation 502, an attempt to connect to a network to access security content at a remote device is made. For example, the connection attempt may include an attempt to connect to the Internet. Further, the attempt may be made for downloading or otherwise retrieving the security content from the remote device.

Additionally, it is determined whether the connection was established, as shown in decision 504. With respect to the present embodiment, determining whether the connection was established may include determining whether a connection to the remote device was successfully established such that the security content may be accessed at the remote device. If it is determined that the connection was established, the security content is received via the network. See operation 506. For example, the security content may be downloaded from the network.

If, however, it is determined that the connection was not established, a state indicating a failure to establish the connection is set. See operation 508. It should be noted that with respect to the present embodiment, the connection may not be established as a result of a malfunction of a device attempting the connection.

In one embodiment, the state may be set by setting a flag indicative of the failure to establish the connection. For example, the flag may be set within an AMT storage area of the device attempting the connection. Such AMT storage area may be remotely accessible for allowing detection of the failure to establish the connection by the remote device.

As another option, an error status event is sent to a central manager. Note operation 510. Such error status event may be sent to the central manager when the central manager is separate from the remote device to which the connection attempt was made, and when a connection to a network for accessing the central manager is made. Thus, the aforementioned flag may not necessarily be utilized, or may be utilized in conjunction with the error status event. Such error status event may indicate the failure to establish the connection.

A serial over LAN connection is then established with the remote device, as shown in operation 512. In one embodiment, the serial over LAN connection may be automatically established by the remote device upon detection by the remote device of the flag indicating the failure to establish the connection. In another embodiment, the serial over LAN connection may be established by the remote device in response to instructions provided to the remote device by the central manager (e.g. where the central manager sends such instructions upon receipt of the error status event).

Furthermore, the security content is received over the serial over LAN connection. Note operation 514. For example, the security content may be downloaded or otherwise retrieved via the serial over LAN connection. The security content is then installed, as shown in operation 516. In this way, the security content may be received via the serial over LAN connection and further installed when a connection to a network to access such security content fails to be established.

As an option, an event may be transmitted over the serial over LAN connection (see operation 518). In one embodiment, the event may be transmitted to the central manager. Such event may include a status of the device that attempted the network connection, where such status is responsive to the receipt of the security content. For example, the event may include version information of the installed contents which in turn can be used in compliance reports (e.g. generated by the central manager).

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program product embodied on a non-transitory computer readable medium, comprising:
   computer code to set a flag to indicate failure of an attempt by a first device to obtain security content from a first remote device using a first protocol over a computer network;
   computer code to detect, by the first remote device, the indication of the failure of the first device to obtain the security content from the first remote device over the computer network; and
   computer code to receive, at the first device, the security content from the first remote device utilizing a serial over local area network connection, wherein the serial over local area network connection utilizes a separate and distinct protocol from the first protocol and is established by the first remote device in response to detecting the indication of the failure of the first device to obtain the security content from the first remote device over the computer network.

2. The computer program product of claim 1, wherein the computer network includes the Internet.

3. The computer program product of claim 1, wherein the security content includes signatures for use in detecting malware.

4. The computer program product of claim 1, wherein failure of the attempt by the first device to obtain the security content from the first remote device is due to a software malfunction at the first device.

5. The computer program product of claim 4, wherein the software malfunction includes a network driver malfunction.

6. The computer program product of claim 1, wherein failure of the attempt by the first device to obtain the security content from the first remote device occurs as a result of the first device being non-compliant with a security policy requiring compliance to connect to the computer network.

7. The computer program product of claim 1, wherein the computer code to set the flag includes computer code to set a flag in a storage area of active management technology provided by a processor of the first device.

8. The computer program product of claim 7, wherein the flag in the storage area is readable by the first remote device.

9. The computer program product of claim 1, further comprising computer code to clear the flag upon receipt of the security content.

10. The computer program product of claim 1, further comprising computer code to clear the flag upon a determination by the first device that a connection to the computer network has been successfully established.

11. The computer program product of claim 1, further comprising computer code to install the security content on the first device.

12. The computer program product of claim 1, wherein the serial over local area network connection includes a connection by the first remote device to an active management technology BIOS of the first device, wherein the active management technology BIOS includes computer code to bypass an operating system network communication protocol while the first device receives the security content.

13. A method, comprising:
   setting a flag, by a first device, to indicate a failure of an attempt to connect, using a first protocol, to a computer network to obtain security content from a first remote device;

detecting, by the first remote device, the indication of the failure of the first device to obtain the security content from the first remote device over the computer network; and receiving, at the first device, the security content utilizing a serial over local area network connection, wherein the serial over local area network connection uses a separate and distinct protocol from the first protocol and is established by the first remote device in response to detecting the indication of the failure of the first device to obtain the security content from the first remote device over the computer network.

14. A system, comprising:

a first device adapted to set a flag to provide an indication of a failure of an attempt to connect to a computer network using a first protocol to obtain security content; and a second device adapted to establish a serial over local area network connection with the first device using a protocol that is separate and distinct from the first protocol in response to a detection of the indication, the connection utilized to send the security content from the second device to the first device.

15. The system of claim 14, wherein the indication of the unsuccessful attempt to connect to the network is provided by setting a flag in a storage area of active management technology provided by a processor of the first device.

16. The system of claim 15, wherein the storage area is readable by the second device for allowing the second device to detect the flag.

17. The system of claim 15, wherein the flag is removed upon receipt of the security content by the first device.

18. The system of claim 14, wherein the serial over local area network (LAN) connection comprises a connection to a virtual serial port of the first device.

* * * * *